INVENTOR.
PAUL O. HARTMAN
ROLAND B. PECK JR.
BY
Henry Kozak
ATTORNEY

Oct. 18, 1966 P. O. HARTMAN ETAL 3,279,004
MACHINE FOR MOLDING HOT METAL
Filed Sept. 23, 1963 2 Sheets-Sheet 2
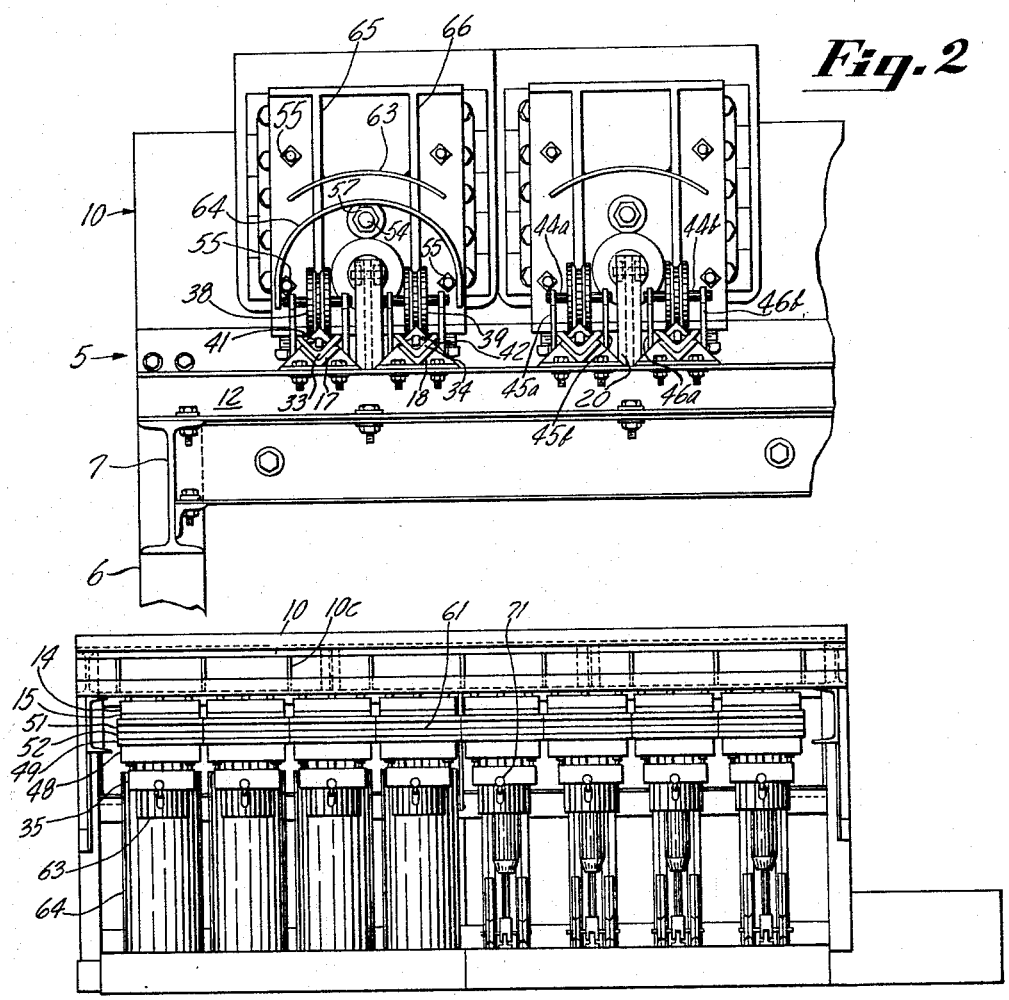
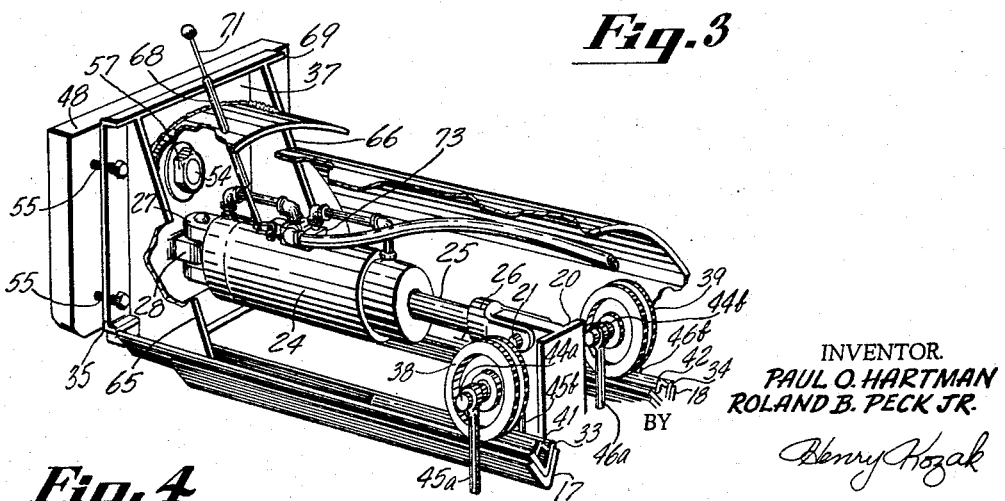
INVENTOR.
PAUL O. HARTMAN
ROLAND B. PECK JR.
BY
Henry Kozak
ATTORNEY

United States Patent Office 3,279,004
Patented Oct. 18, 1966

3,279,004
MACHINE FOR MOLDING HOT METAL
Paul O. Hartman, Scottsdale, and Roland B. Peck, Jr., Phoenix, Ariz., assignors, by mesne assignments, to Midland-Ross Corporation, Cleveland, Ohio, a corporation of Ohio
Filed Sept. 23, 1963, Ser. No. 310,589
5 Claims. (Cl. 22—92)

This invention relates to a machine for supporting and separating the halves of molds and cores used in the manufacture of metal castings.

The machine about to be described, in its normally intended use, will include permanent mold-halves and one or more disposable cores supported between the mold-halves by urging one mold-half toward the other. Machines of this general type are particularly suitable for casting objects which may be cast in clusters, such as steel balls used in the grinding mills of the ore processing industry.

One problem that has confronted the users and manufacturers of these machines is the lack of power-operated machines which permit the use of overhead pouring equipment without subjecting parts which must be maintained in a clean condition free from the drip and splatter of hot metal that usually accompanies pouring operations. Another disadvantage of the prior art power-operated machines is that they are not arranged in a manner permitting gravity-discharge of solidified castings and core material to a receptacle underneath the casting region of the machine. For example, one type of conventional machine comprises four parallel rods terminating in a fixed platen, a movable platen slidable along intermediate portions of the rods toward and away from the fixed platen, and a platen-traversing apparatus standing between the movable platen and an abutment anchored to the rods adjacent their other termini. This type of machine is unsuitable for use in a battery of molding machines positioned side by side wherein the permanent mold and cores of the various machines are disposed in tight end-to-end arrangement as a single mold. Obviously, pouring equipment would drip hot metal across the rods of such conventional machines, and such rods would interfere with installation of cores placed in end-to-end relationship, and with the gravity-ejection of the cores and castings.

Hence, an important object of the present invention is to provide a molding machine suitable for hot metal casting in which parts of the machine are arranged to fully expose pouring spouts, runners, or other portions of a mold that receives hot metal from a ladle. Incidental to this object is the object of having all portions of the machine, except the top areas of the mold, concealed or removed from the hot metal pouring region.

A further object is to provide a molding machine which may be incorporated in a battery of such machines in side-by-side relationship with the mold portions thereof in end-to-end relationship to align mold and core portions of the entire battery into a single molding unit capable of receiving metal during a single pouring operation.

Another object is to provide a molding machine in accordance with the above recited objects which may be arranged within batteries of similar machines and such batteries arranged in back-to-back relation along a walk or an aisle from which the hot-metal receiving region of each machine may be tended and each machine may be controlled easily by an operator.

An object ancillary to this last-named object is that the machines be of a design disposing the manual controls thereof within easy reaching distance of the aisle.

A further object in arranging such batteries is that the individual machines be arranged so that the hot poured castings and disposable core material may be dropped by gravity from the machines and then caused to slide down an incline away from the aisle and toward a region beyond the machines.

The invention achieves such objects and others that may become herein apparent by a molding machine having a base of generally vertically open construction above and below the casting region thereof; a mold means, such as a back-up plate and a permanent mold-half, fixed to the base and presenting a molding face facing in a generally horizontal direction; a horizontal guideway, such as a pair of parallel rails, in downward offset relation with the above-named face, with the length of the guideway extending frontwardly relative to the face and generally parallel to the direction in which it faces.

The machine further comprises a reciprocable mold member which may also include a backing plate and a mold-half in such guide relation with the guideway as to be movable along a path lengthwise of the guideway. The guiding facilities of the mold member and the guideway include means for holding the reciprocal mold member in fixed angular but slidable relation with the guideway in order that the mold member may be traversed along its path without tilting by traversing means acting on the member at a higher level than the guideway. The machine also has a support member projecting upwardly from the base in fixed relation therewith adjacent the end of the mold member path furthest from the fixed mold means to provide a portion of the support member located above the guideway. An expansible and contractible means, such as the fluid cylinder, piston, rod assembly, is disposed between, and connected to, the support member and the reciprocal mold member along an axis above, and generally parallel to, the guideway which, when actuated by fluid, traverses the mold member along the path.

In the drawing with respect to which the invention is described hereinbelow:

FIG. 2 is an end elevation illustrating two machines of the type shown in FIG. 1 in side-by-side longitudinally parallel relationship;

Figure 1:
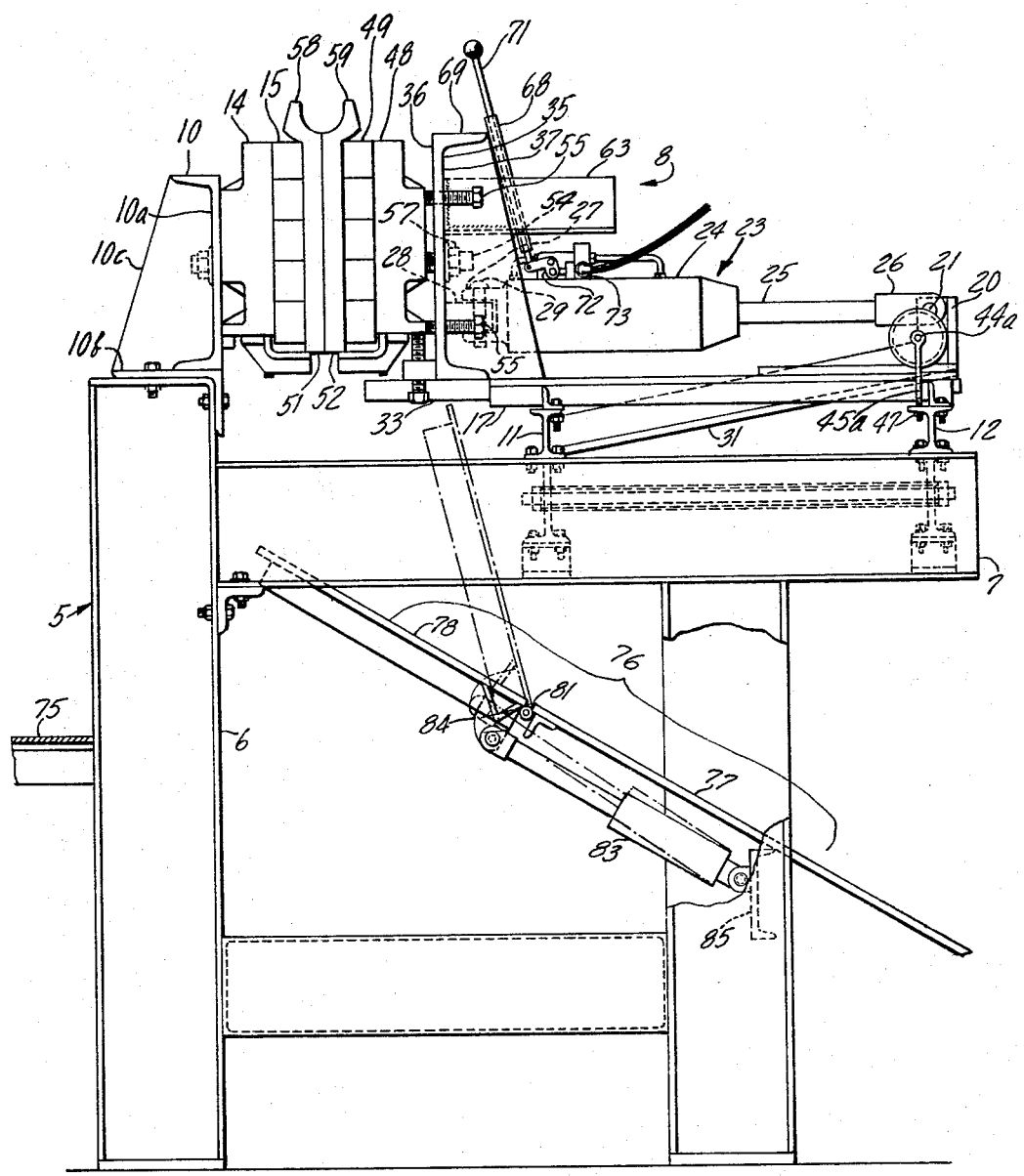
FIG. 1 is a fragmentary longitudinal elevation, with some parts removed and other parts broken away, of a molding machine in accordance with the invention.

FIG. 3 is a plan view of a battery of machines of the type illustrated in FIGS. 1 and 2 arranged to integrate respective hot metal receiving portions into a single molding unit; four of the machines being shown with protective shrouds removed; and FIG. 4 is a perspective fragmentary view of the traversable portion of the machine as shown in the other figures, and the fixed guiding facilities of the machine on which the traversable portion is supported.

In FIG. 1 is shown a substantially complete machine in accordance with the invention. In FIGS. 2 and 3, pluralities of the machine of FIG. 1 are shown, whereas in FIG. 4 essentially the reciprocating part of the machine is shown. As depicted most clearly in FIG. 1, the machine comprises a base 5 suitable in its entirety for supporting a battery of opposing mold members as shown in FIG. 3. The base, as shown, comprises a vertical post 6 and two or more heavy I-sections 7 which extend horizontally from the post parallel to the direction of reciprocation of a mold supporting the carriage 8. The base further comprises frame members 10, 11, and 12 which extend horizontally and transversely with respect to the paths of reciprocation of the various carriages 8. The beam or frame member 10, shown at the rear end of the machine, is constructed of a channel 10a, an angle iron 10b, and a plurality of webs 10c all welded together. The member extends transversely of the length of each single machine of the battery, but lengthwise of the battery, as shown in FIG. 3, to provide support for the back plate 14 and permanent mold section 15 of each machine. The members 11 and 12 are shown as beams of I-section to which are attached a pair of V-shaped parallel tracks 17 and 18. Shown attached to the beam 12 in the front portion of the machine is a post 20 which extends upwardly above the rails 17 and 18 in horizontally spaced relation with the frame member 10 and the back plate 14 attached thereto. Adjacent its upper end, the post 20 provides a bearing defining a horizontal opening therethrough for receiving a pin 21. This pin connects one end of an assembly 23 comprising a cylinder 24, a piston within the cylinder, and a piston rod 25 terminating in a pin bearing 26 which also receives the pin 21 and thus is connected to the post 20. As shown, it is the cylinder of this assembly that is connected to the reciprocating carriage 8 by its head portion 27 forming a bifurcate or clevis type bearing which receives a vertically apertured lug or bearing 28 connected therewith by a pin 29. Because of the thrust produced on the post 20 by the cylinder assembly 23, the post is further reinforced by a brace 31 extending from it to the beam 11. Thus, the support or post 20 and the back plate 14 are associated in cantilever relation with the base of the machine from which compressive forces on opposed mold-halves may be directed.

The carriage 8 comprises a pair of V-shaped runners 33 and 34 disposed with their outer dihedral surfaces engaging the internal dihedral surfaces of the rails 17 and 18. The carriage 8 is further constituted of a buttress 35 providing a vertical face 36 facing across the casting region of the machine toward the fixed mold member 15. The buttress 35 is secured to the runners 33 and 34 as by welding along the lower extremity of the buttress 35. The bearing lug 28 is attached to the front surface 37 of the buttress, i.e., at the surface thereof facing toward the support or post 20.

As the cylinder assembly 23 is attached to the post 20 and the buttress along a plane generally parallel to the track comprising the rails 17 and 18 but at a substantially higher level than the track, any tendency of the runners 33 and 34 to tilt upwardly, i.e., to raise the front ends of the runners adjacent the post away from the track is overcome by sheaves 38 and 39 which are supported from a fixed portion of the machine, e.g., the beam 12, in rolling contact with the upper surfaces of runners 33 and 34. As shown, the upper surfaces of the runners are defined by angle irons 41 and 42 welded to the lower larger angle irons of the runners to orient the outer dihedral surfaces of the angle irons 41 and 42 in upward facing attitude whereby they are adapted to be followed by the grooved peripheries of the sheaves 38 and 39. Each sheave is supported on a shaft (see shafts 44a and 44b) substantially fixed with respect to the non-reciprocating portions of the machine by a pair of eye-bolts. The shaft 44a, e.g., is supported by the eye-bolts 45a and 45b; eye-bolts 46a and 46b support the shaft 44b. The nuts on these bolts, e.g., nut 47, bear on a downward facing web surface of the beam 12. Rotation of these nuts renders the sheaves 38 and 39 vertically adjustable to increase or lessen the clearance between the sheaves and the rails 17 and 18, i.e., the space within which the runners 33 and 34 pass. In practice, the sheaves 38 and 39 are adjusted to maintain the runners in close but freely slidable relation with the track and the mold member in fixed angular relation with the track, i.e., the rails 17 and 18.

As the drawing and the above description indicate, rails 17 and 18 constitute a guideway and together with the runners 33 and 34 constitute guide means for controlling movement of the movable mold-half 49 relative to the stationary mold-half 15. While the guide means just described includes also the sheaves 38 and 39, the portion of the guide means extending rearwardly past the post or support 20, also rearwardly of the sheaves, is disposed generally below a level adjacent to the lower extremities of the opposing mold-halves. As shown, these guide means portions are disposed below the mold-halves. The cylinder assembly for traversing the movable mold-half is, of course, above this portion of the guide mechanism. In accordance with the above stated object, such arrangement leaves the space above the bottom portions of the mold-halves substantially clear of any mechanism for guiding the movable mold-half and associate supporting structure relative to the stationary mold-half.

The essential function of the buttress 35 is to support a backing plate 48 for a permanent mold-half 49. The molding face of the mold-half 49 extends in a perpendicular or vertical direction, causing it to face in a direction parallel to the lengths of rails 17 and 18. When the carriage 8 is urged toward the member 10, a pair of disposable cores 51 and 52 is confined between the mold-halves 15 and 49. The structure of the mold-halves 15, 49 and the cores 51, 52 is not described in detail herein since the construction and use of molds of this design is well known. The present invention is concerned primarily with the combination as presented by the molding machine in its entirety.

The backing plate 48 is mounted on the buttress 35 by a central stud 54 and a plurality of bolts 55 in threaded relation with the buttress 35. The bolts 55 may be adjusted to obtain a desired angular relationship of the backing plate 48 and the mold-half 49 with the buttress 35 producing accurately parallel face-to-face engagement of the cores 51 and 52. When proper adjustment is obtained, a nut 57 on the stud 54 places the stud under tensile strength whereas the bolts 55 are subjected to compression forces.

In order to obtain the unitary mold arrangement of a battery of such machines as shown in FIG. 3, it is necessary for the sheaves to be accurately spaced in order to bring the end surfaces of the cores of adjacent machines in abutting relationship. This is necessary since the cores comprise concave arcuately-shaped top flanges 58, 59. Flanges 58, 59 of face-to-face cores define a semi-circular runner surface or trough in which hot metal may flow into various down sprues of the cores. To assist in distributing hot metal along the runner, the battery of machines may be sloped in a direction lengthwise of a trough 61 shown in FIG. 3. The trough is dammed at its lower extremity.

As shown in FIGS. 2 and 3, the machines comprise a pair of protecting shrouds 63 and 64. The upper smaller shroud 63 is fixed permanently to the buttress 35 by, for example, being welded to the webs 65 and 66. As shown in FIG. 1, the shroud 63 is transfixed by a tubular housing 68 welded thereto. The housing 68 is also welded to the upper flange 69 of the buttress for the additional support of the housing. This housing functions as a guide for a push rod 71 which extends therethrough and connects with a lever 72 for operating an air valve 73. The upper extremity of the push rod is disposed in a region suprajacent the buttress 35 for convenience of operation from the aisle 75.

As an air-operated cylinder is satisfactory for traversing the carriage 8, the valve 73 is a conventional 4-way valve for feeding air alternately to opposite ends of the cylinder and providing air exhaust from the end of the cylinder toward which the piston is moving. In normal operation, the machine will be controlled by an operator standing in the aisle 75 who can easily reach over the casting region to manipulate the push rods 71 of the various machines. The same operator may also have under surveillance another battery of machines on the other side of the aisle. In this manner many batteries of machines may be located along opposite sides of one aisle and tended by a single operator. The present machine is especially designed to effectuate this objective.

The molding machine is purposely designed with open construction below the molding region in which the mold-halves 15, 49 and the cores 51, 52 are located during pouring operations. The main horizontal base members 7 extend parallel to the lengths of the individual machines and may be disposed near the opposite ends of a battery frame. Hence, a further feature of the machine is that it is open directly underneath the permanent molds 15, 49 and the cores 51, 52 when held in assembled relationship, as shown in FIG. 1. When the castings and cores are dropped from between the permanent molds by retraction of the carriage 8, it is then advantageous to transfer this hot material away from the operator's aisle adjacent to post 6. Hence, the machine is provided with an inclined platform 76 supported within a base of the machine. The platform comprises one portion 77 fixed rigidly within the base and another swingable portion 78 directly under the pouring region of the machine. This latter portion is hinged to the fixed platform 77 along its upper edge at 81. During pouring, the platform portion 78 is swung to the upward position shown in dash-outline so as to avoid collection thereon of any debris or hot metal splatter which might impair the facility of core material and castings to slide down the platform. Means, such as the air cylinder 83 reacting between a bracket 84 of the swingable platform portion and a base member 85, may be used for raising the platform portion 78. Obviously, the platform may be used to discharge castings and spent core material onto a conveyor aisle or other receptacle. It is also apparaent that other machines or battery machines may be disposed on the opposite side of such aisle or conveyor so that two rows of machines may be discharging material into the same conveyor or aisle between them.

The terms and expressions which have been employed are used as terms of description and not of limitation and there is no intention of excluding such equivalents of the invention described or portions thereof as fall within the scope of the claims.

What is claimed is:

1. A molding machine adapted for receiving hot metal pouring equipment overhead comprising:
    (A) a base;
    (B) mold means in fixed, generally upwardly extending relation with the base having a molding face facing in a generally horizontal direction toward the front end of the machine;
    (C) a horizontal guideway disposed in downward offset relation with said face and its length extending in a frontward direction relative to said face in generally parallel relation to said horizontal direction;
    (D) a reciprocal mold member in guide relation with said guideway and sharing guide means therewith restricting relative movement to a path lengthwise of the guideway, said guide means including means establishing fixed angular but slidable relation of the member with the guideway, said member having a molding face in opposed relation with said face of the mold means;
    (E) a support member projecting upwardly from the base in fixed relation therewith adjacent the end of the path further from said mold means, said support member and said mold means being disposed in horizontaly opposed relationship in generally cantilever relation with said base; and
    (F) expansible and contractible means disposed between, and connected to, said members along an axis above, and generally parallel to, said guideway for traversing the mold member lengthwise of said path;
    (G) any portions of said guideway and said guide means extending immediately rearward of said support and rearwardly thereof lengthwise of the guideway being disposed below a level adjacent the lower extremities of said molding faces, said expansible and contractible means being thus disposed above said guideway and guide means portions, and the space above, and coextensive with, such portions being clear of any mechanism for guiding said member relative to said molding means.

2. A molding machine adpated for receiving hot metal pouring equipment overhead comprising:
    (A) a base;
    (B) mold means in fixed, generally upwardly extending relation with the base having a molding face facing in a generally horizontal direction toward the front end of the machine;
    (C) a horizontal guide way disposed in downward offset relation with said face and its length extending in a frontward direction relative to said face generally parallel to said horizontal direction;
    (D) a reciprocal mold member in guide relation with the guideway and sharing cooperating guide means therewith restricting movement of the member relative to a path extending lengthwise of the guideway, said guide means including means establishing fixed angular but slidable relation of the member with the guideway, said member having a molding face in opposed relation with said face of the mold means;
    (E) a support member projecting upwardly from the base in fixed relation therewith to a point above the guideway adjacent the end of said path further from the mold means, said support member and said mold means being disposed in horizontally opposed relationship and in generally cantilever relation with said base;
    (F) a fluid cylinder, piston, and rod assembly disposed above the guideway between, and connected to, said members along the axis above, and generally parallel to, said guideway for traversing the mold member lengthwise of said path;
    (G) any portions of said guideway and said guide means extending from immediately rearward of said support, and rearwardly thereof lengthwise of the guideway, being disposed below a level adjacent the lower extremities of said molding faces, said assembly being thus disposed above said guideway and guide means portions, and a space above, and horizontally coextensive with, said portions being clear of any mechanism for guiding said member relative to said molding means.

3. The molding machine of claim 2 wherein;
the guideway comprises a pair of rails fixed to the base;
a pair of elongate runners are attached to the mold member adjacent the ends of the runners nearer the mold means to place each runner in guide relation with one of said rails; and
said machine comprises a pair of sheaves rotatably supported with respective axes of rotation in approximately fixed relation with the base, each sheave supported in rolling relation with the upper surface of one of said runners with the undersurface of the runner slidably engaged with the upper surface of the adjacent rail.

4. The molding machine of claim 3 comprising:
means for supporting the sheaves including the means for adjusting the height of said sheaves above the base.

5. The molding machine of claim 2 wherein:
the cylinder is connected to the mold member and the machine comprises a valve for alternately charging a fluid into opposite ends of the cylinder,
said valve being mounted on the assembly comprising the mold member and the cylinder to reciprocate therewith; and lever means carried by said cylinder and mold assembly for controlling the valve from a region suprajacent the mold member.

References Cited by the Examiner

UNITED STATES PATENTS

| | | | |
|---|---|---|---|
| 1,046,386 | 12/1912 | Heimer | 198—157 |
| 1,931,769 | 10/1933 | Newton | 22—92 |
| 2,498,264 | 2/1950 | Goldhard | 22—92 |
| 2,837,797 | 6/1958 | Norton et al. | 22—130 |
| 3,012,279 | 12/1961 | Boysen | 18—2 |

FOREIGN PATENTS 656,453  8/1951  Great Britain.

J. SPENCER OVERHOLSER, *Primary Examiner.*

R. D. BALDWIN, *Assistant Examiner.*